3,317,204
TORSION BAR ASSEMBLY
Heinrich Maennig, Kassel, and Fritz Bölling, Ellingerode, Witzenhausen, Germany, assignors to Henschel-Werke A.G., Kassel, Germany, a corporation of Germany
Filed Feb. 15, 1965, Ser. No. 434,736
Claims priority, application Germany, May 29, 1964, H 52,809
8 Claims. (Cl. 267—57)

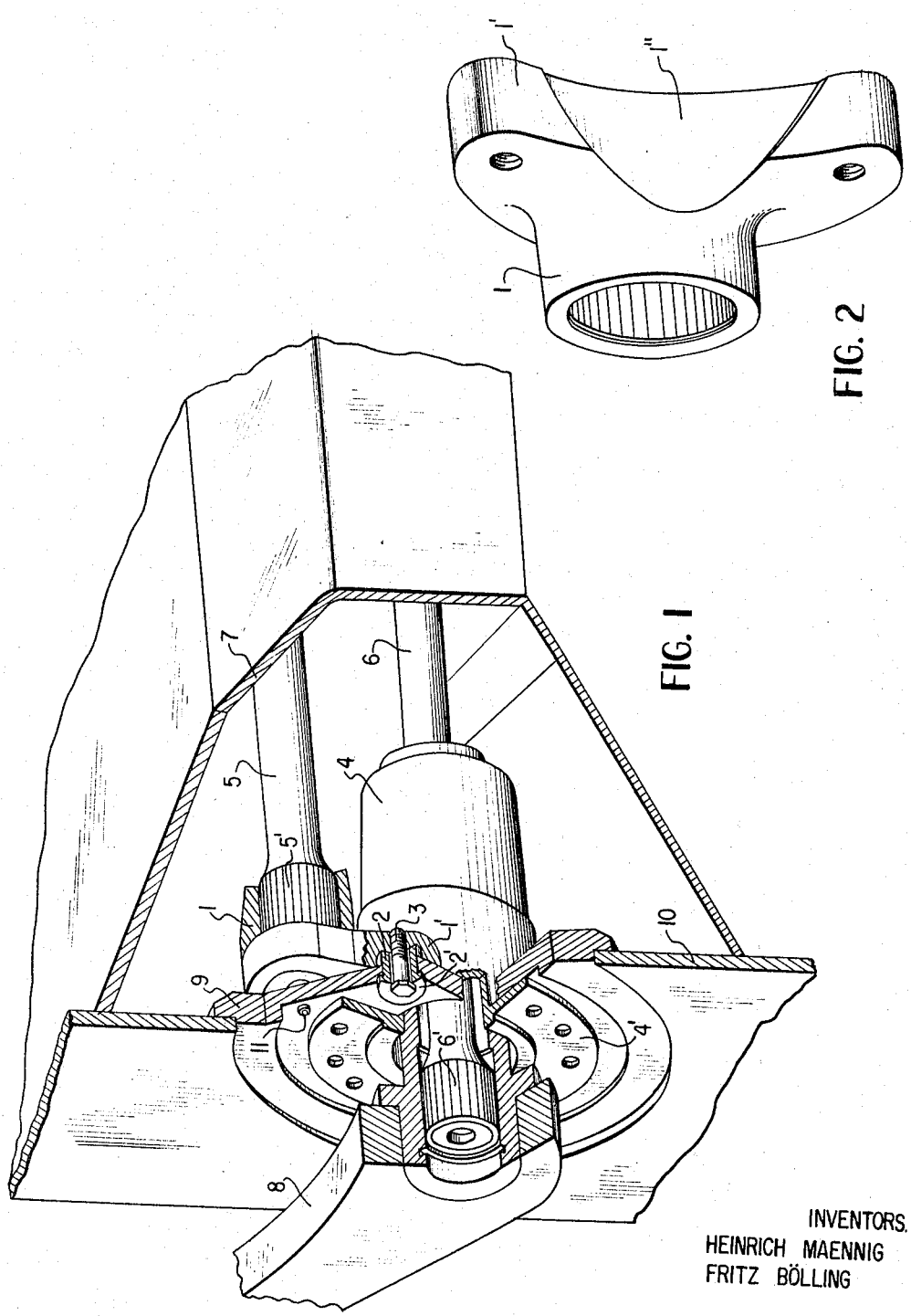

The present invention relates to a torsion bar assembly which is particularly adapted for use in armored combat vehicles having tracks.

In combat vehicles of the aforementioned type, longitudinal rocker arms are mounted at the sides of the vehicle body and are connected to rocker arm bearings also mounted in the side wall of the body. The torsion bars are mounted at one end in the rotatable inner portion of the rocker arm bearings and the other end is rigidly secured in a stationary bearing mounted on the opposite side wall of the vehicle body.

The mounting of the radial and stationary bearings of torsion bars is customarily effected in a manner such that, when viewed in the longitudinal direction of the torsion bars, they are mounted side by side in an integral, generally cast, bearing housing. This construction necessitates an essentially oval-shape of the bearing front plate by means of which the bearing housing is secured to the side wall of the vehicle body. Machining of the oval bearing surface on the bearing housing, and particularly on the vehicle body, is complicated and expensive.

It is also known to make the pivot bearing and the stationary bearing as structurally independent individual parts. In this case, however, installation of the stationary bearing can be effected only with considerable difficulty and, in the heretofore known constructions, only from the inside of the vehicle. This is particularly disadvantageous in vehicles in which the torsion bars, which are mounted closely above the bottom of the vehicle body, are protected against damage by protective housings which housings simultaneously serve for reinforcing the bottom of the vehicle body. If an opening must be made in the housing for the purpose of installing the stationary bearing, the reinforcing effect of the housing is reduced.

The mounting of torsion bars as provided by the present invention eliminates the disadvantage of the heretofore known constructions. The stationary bearing and the securing means therefor are so mounted that the bearing may be installed in the vehicle body from the outside through a central bore in which the rocker arm bearing is later received. All of the plane surfaces of the side body wall to be machined are circular in shape and positioned at the exterior of the body. The bores required may be machined at a line of intersection which extends inwardly from the exterior of the body.

The stationary bearing, together with a flange thereon, is positioned on centering bushings at a slight distance from the inside of the vehicle body wall. In order to accurately install the bushings and the stationary bearing, the bushings are provided with a collar which is fitted into a counterbore on the outside of the side body wall. Counterbores are also provided in the flange of the stationary bearing which counterbores assist in seating the flange on the centering bushings. The stationary bearing is retained on the centering bushings by means of threaded members such as bolts or screws, for example hexagonal cap screws or internal hexagon cap screws, which may be threaded into internal threads in the flange of the stationary bearing from the outside of the body through the centering bushings. The centering bushings are fitted into the bores in the body in an easily removable manner or are secured therein by a press fit, a shrink fit, or they may be threaded therein.

In another embodiment of the present invention, the centering bushings, rather than being secured in the body wall by a press fit, shrink fit or threaded fit, are secured in bores in the body by means of a bolted-on flange of the rocker arm bearing which is positioned adjacent the centering bushings on the outside of the vehicle body wall. The stationary bearing flange is so positioned that the bolts or screws with which it is secured to the centering bushings are positioned approximately on the bolthole circle of the flange of the rocker arm bearing. This arrangement makes it possible to maintain the distance between the two bearing axes small in a desired manner. For this purpose, the stationary bearing is also provided on the side facing the rocker arm bearing housing with a recess which is conformed to the outer configuration of the latter.

In a further embodiment of the present invention, centering bolts instead of centering bushings are threaded into the side wall of the vehicle body or may be press fitted or fitted therein by a shrink fit. The bolts are provided with a projection upon which the stationary bearing flange may be centered. The flange is secured by means of nuts threaded onto the centering bolts from the inside of the vehicle by reaching through the central bore in the side body wall which bore will later receive the rocker arm bearing.

It has been found that the seating of torsion bars in stationary bearings through the rocker arm bearing aperture in the opposite side body wall can be effected only with great difficulty. In accordance with the present invention, a bore is provided in the side body wall, the longitudinal axis of which coincides with a straight-line extension or elongation of the longitudinal axis of the stationary bearing. The bore is sufficiently large that a bar which, for example, may be threaded into the end of the torsion bar may be passed therethrough. Such a bar threaded into the end of the torsion bar may then be employed to seat the torsion bar in the stationary bearing, after which it may be disconnected from the torsion bar and removed. In order to protect the interior of the vehicle from foreign materials such as dirt, water, and the like, the bore is closed after the installation of the torsion bar by means of a threaded plug, or the like.

The invention will be further illustrated by reference to the accompanying drawings in which FIGURE 1 is a perspective view of the torsion bar assembly of the present invention together with a rocker arm 8 secured thereto, and FIGURE 2 is a perspective view of the stationary bearing 1 showing a recess 1" which is shaped to conform to the configuration of the rocker arm bearing housing.

Referring to the drawings, two torsion bars 5 and 6 are enclosed by a protective housing 7. The torsion bar 6 which cushions a wheel on the rocker arm 8, not shown, is secured to the rocker arm 8 by means of the splines 6'. The mounting of the torsion rod 6 at the other end thereof is not illustrated but corresponds to the illustrated mounting of the torsion bar 5 which extends from a rocker arm similar to the rocker arm 8 at the opposite side of the body. It consists of a stationary bearing 1 into which the splined end 5' of a torsion bar 5 is inserted, rotation of the bar 5 relative to the stationary bearing 1 thereby being prevented. The stationary bearing 1 is seated on the centering bushing 2, only one of which is visible in FIGURE 1, and is secured by means of hexagonal cap screws 3 which are threaded into the flange 1' of the stationary bearing 1.

The rocker arm bearing 4 is secured to a reinforcing plate 9 which is welded into an aperture in the vehicle side body wall 10 and the centering bushings 2 are seated in counterbores in the reinforcing plate 9. The collars 2' of the centering bushings are covered by the flange 4' of the rocker arm bearing 4, the flange 4' being provided with bores through which the hexagonal cap screws 3 may be passed and threaded into the stationary bearing 1.

A bore in the reinforcing plate 9, which is normally closed by the threaded plug 11 makes it possible to seat the torsion bar 5 in the stationary bearing 1 in a particularly simple manner with the aid of a bar which is extended through the bore and threaded into the end of the torsion bar 5.

It will be obvious to those skilled in the art that many modifications may be made within the scope of the present invention without departing from the spirit thereof, and the invention includes all such modifications.

What is claimed is:

1. A torsion bar assembly comprising a torsion bar mounted in a rocker arm bearing in a side wall of a vehicle body, and stationary bearing means having a flange secured on centering means at a slight distance from the inner side of the body wall, whereby the stationary bearing means may be installed through an aperture in the side wall for receiving the rocker arm bearing.

2. A torsion bar assembly according to claim 1 in which a torsion bar is seated in the stationary bearing.

3. A torsion bar assembly according to claim 1 in which the flange of the stationary bearing has counterbores therein whereby it may be seated on the centering means.

4. A torsion bar assembly according to claim 3 in which the centering means is a plurality of centering bushings.

5. A torsion bar assembly according to claim 1 in which the stationary bearing is secured on the centering means by threaded means passing through the centering means.

6. A torsion bar assembly according to claim 1 in which the centering means are seated in counterbores in the exterior of the body wall.

7. A torsion bar assembly according to claim 1 in which the stationary bearing is provided with a recess on one side thereof facing a housing for the rocker arm bearing, the recess conforming to the shape of the housing.

8. A method of seating a torsion bar in a stationary bearing which comprises inserting a guiding member through an aperture in the stationary bearing, connecting the guiding member to one end of the torsion bar, withdrawing the guiding member through the aperture, and disconnecting the guiding member from the bar.

References Cited by the Examiner

UNITED STATES PATENTS

| | | | |
|---|---|---|---|
| 2,457,583 | 12/1948 | McCaslin | 267—57 |
| 3,047,283 | 7/1962 | Kivell | 267—57 |

ARTHUR L. LA POINT, *Primary Examiner.*

R. M. WOHLFARTH, *Assistant Examiner.*